(12) United States Patent
Oksman

(10) Patent No.: US 8,718,067 B2
(45) Date of Patent: May 6, 2014

(54) PRE-EMPTION MECHANISM FOR PACKET TRANSPORT

(75) Inventor: Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 971 days.

(21) Appl. No.: 10/996,667

(22) Filed: Nov. 24, 2004

(65) Prior Publication Data

US 2006/0109864 A1    May 25, 2006

(51) Int. Cl.
*H04L 12/56*    (2011.01)

(52) U.S. Cl.
USPC ........................ 370/395.42; 370/474

(58) Field of Classification Search
USPC .............. 370/389, 474, 399, 395.5
See application file for complete search history.

(56) References Cited

U.S. PATENT DOCUMENTS

| | | | | |
|---|---|---|---|---|
| 5,343,473 A * | 8/1994 | Cidon et al. | ................ | 370/465 |
| 5,428,611 A | 6/1995 | Jain et al. | | |
| 5,734,867 A | 3/1998 | Clanton et al. | | |
| 5,878,045 A * | 3/1999 | Timbs | ................ | 370/466 |
| 6,112,245 A | 8/2000 | Araujo et al. | | |
| 6,377,782 B1 * | 4/2002 | Bishop et al. | ................ | 455/3.01 |
| 6,463,071 B1 * | 10/2002 | Araujo et al. | ................ | 370/437 |
| 6,542,490 B1 * | 4/2003 | Ahmadvand et al. | ........ | 370/338 |
| 6,865,150 B1 * | 3/2005 | Perkins et al. | ................ | 370/230 |
| 6,963,561 B1 * | 11/2005 | Lahat | ................ | 370/356 |
| 6,985,488 B2 * | 1/2006 | Pan et al. | ................ | 370/395.3 |
| 6,990,105 B1 * | 1/2006 | Brueckheimer et al. | ... | 370/395.5 |
| 7,006,500 B1 * | 2/2006 | Pedersen et al. | ............ | 370/394 |
| 7,114,009 B2 * | 9/2006 | Jones et al. | ................ | 709/250 |
| 7,197,026 B2 * | 3/2007 | Chen et al. | ................ | 370/342 |
| 7,376,836 B2 * | 5/2008 | Graves et al. | ................ | 713/168 |
| 7,464,180 B1 * | 12/2008 | Jacobs et al. | ................ | 709/240 |
| 7,570,656 B2 * | 8/2009 | Raphaeli et al. | ............ | 370/445 |
| 8,036,237 B2 * | 10/2011 | Kolli et al. | ................ | 370/409 |
| 2002/0087716 A1 * | 7/2002 | Mustafa | ................ | 709/236 |
| 2002/0145974 A1 * | 10/2002 | Saidi et al. | ................ | 370/230 |
| 2002/0159389 A1 | 10/2002 | Foster et al. | | |
| 2003/0095054 A1 | 5/2003 | Ichino | | |
| 2003/0174664 A1 | 9/2003 | Benveniste | | |
| 2003/0193945 A1 | 10/2003 | Lewin et al. | | |
| 2004/0062198 A1 * | 4/2004 | Pedersen et al. | ............ | 370/229 |
| 2004/0184450 A1 * | 9/2004 | Omran | ................ | 370/372 |
| 2004/0190548 A1 * | 9/2004 | Harel et al. | ................ | 370/466 |
| 2005/0129028 A1 * | 6/2005 | Peeters et al. | ............ | 370/395.21 |
| 2006/0062224 A1 * | 3/2006 | Levy et al. | ................ | 370/395.6 |
| 2007/0025361 A1 * | 2/2007 | Lin et al. | ................ | 370/399 |

OTHER PUBLICATIONS

"61.2.3.3.1 TC Encapsulation and Coding", IEEE Draft P802 3ah TM/D3. Dec. 5, 2003, pp. 344-354.

(Continued)

*Primary Examiner* — Hassan Kizou
*Assistant Examiner* — Roberta A Shand
(74) *Attorney, Agent, or Firm* — Eschweiler & Associates, LLC

(57) ABSTRACT

Protocols or methods are presented for encapsulating data from packets of different priorities and pre-emption techniques therefor using (N+M) byte frames for transmission in a communications system. The methods involve selectively suspending encapsulation of low-priority data packets to encapsulate a higher priority pre-empting data packet, and resuming encapsulation all or a portion of remaining data from a suspended low-priority data packet in a frame in which a pre-empting higher priority data packet is completed.

32 Claims, 10 Drawing Sheets

(56) References Cited

OTHER PUBLICATIONS

Cosco, Broadcom, Ericsson "Modified 64/65B encapsulation to support preemption", Temporary Document LB-036, Leuven, Belgium, Jun. 2004, 7 pgs.

Cosco, Broadcom, Ericsson Modified 64/65B encapsulation to support pre-emption and short frames, Temporary Document LC-094R1, Lake Tahoe, California, Aug. 2004, 4 pgs.

* cited by examiner

| | Frame Type | Frame Contents | Sync Byte | $P_0$ | $P_1$ | $P_2$ | --- | $P_{k-1}$ | $P_k$ | $P_{k+1}$ | --- | $P_n$ | --- | $P_{61}$ | $P_{62}$ | $P_{63}$ |
|---|---|---|---|---|---|---|---|---|---|---|---|---|---|---|---|---|
| | | | | | | | | | | | Data Field, bytes 1-64 in byte fields $P_0$-$P_{63}$ | | | | | |
| R1 | Data only | Data bytes (D) only | $0F_H$ | $D_0$ | $D_1$ | $D_2$ | --- | $D_{k-1}$ | $D_k$ | --- | --- | --- | --- | $D_{61}$ | $D_{62}$ | $D_{63}$ |
| R2 | End of packet | Control byte ($C_k$) followed by k bytes of data, others are idle (Z) | $F0_H$ | $C_k$ | $D_0$ | $D_1$ | --- | $D_{k-1}$ | Z | --- | --- | --- | --- | Z | Z | Z |
| R3 | End of packet and Start of next packet | Control byte ($C_k$) followed by k bytes of data, final j bytes are data from the next frame. S-byte indicates start of next packet | $F0_H$ | $C_k$ | $D_0$ | --- | --- | $D_{k-1}$ | Z | Z | --- | S | --- | $D_{j-3}$ | $D_{j-2}$ | $D_{j-1}$ |
| R4 | Idle | Idle bytes (Z) only | $F0_H$ | N | N | N | --- | N | N | N | --- | N | --- | N | N | N |
| R5 | Start of packet while idle | First k bytes are idle (Z), last j=64-k-1 bytes are data. S byte indicates start of the packet | $F0_H$ | N | N | N | --- | --- | S | $D_0$ | --- | $D_0$ | --- | $D_{j-3}$ | $D_{j-2}$ | $D_{j-1}$ |
| R6 | Idle, no sync | Idle bytes (Z) only | $F0_H$ | Y | N | N | N | N | N | N | N | N | --- | N | N | N |
| R7 | End of packet and Multiple short packets | (1) Control byte ($C_k$) followed by k bytes of data.<br>(2) Control byte(s) ($C_i$) followed by Z-bytes, S-byte, and a packet which ends at byte $D_{q-1}$, j bytes altogether.<br>(3) Last bytes may be all Z or another combination of $C_{j1}$, Z-bytes, S-byte, and the next packet.<br>(4) If this packet ends in a subsequent frame, $C_{j1}$ = Z (or S). | $F0_H$ | $C_k$ | $D_0$ | --- | --- | $D_{k-1}$ | $C_i$ | --- | $D_{q-1}$ | S | $D_0$ | --- | $D_{q-1}$ | Z |
| R8 | Short packet or Multiple short packets | (1) Control byte ($C_i$) followed by Z-bytes, S-byte, and a packet which ends at byte $D_{q-1}$, i bytes altogether.<br>(2) Last bytes may be all Z or another combination of $C_{j1}$, Z-bytes, S-byte, and the next packet.<br>(3) If this packet ends in a subsequent frame, $C_{j1}$ = Z (or S). | $F0_H$ | $C_i$ | N | --- | --- | S | $D_0$ | --- | $D_{q-1}$ | $C_i$ | S | --- | $D_{q1-1}$ | Z |

FIG. 1A

| | Frame Type | Frame Contents | Sync Byte | Data Field, bytes 1-64 in byte fields $P_0$-$P_{63}$ | | | | | | | | | | |
|---|---|---|---|---|---|---|---|---|---|---|---|---|---|---|
| | | | | $P_0$ | $P_1$ | $P_2$ | ... | $P_{k-1}$ | $P_k$ | $P_{k+1}$ | ... | $P_n$ | ... | $P_{61}$ | $P_{62}$ | $P_{63}$ |
| R9 | Start long pre-empt packet | Long packet of pre-empt data (64 bytes or more) – first frame data bytes (D) only | $F5_H$ | $C_i = Z$ | $D_0$ | $D_1$ | ... | $D_{k-2}$ | $D_{k-1}$ | $D_k$ | ... | ... | ... | $D_{60}$ | $D_{61}$ | $D_{62}$ |
| R10 | Pre-empt data | Long packet of pre-empt data (64 bytes or more) – first frame data bytes (D) only | $AF_H$ | $D_0$ | $D_1$ | $D_2$ | ... | $D_{k-1}$ | $D_k$ | $D_{k+1}$ | ... | ... | ... | $D_{61}$ | $D_{62}$ | $D_{63}$ |
| R11 | End of pre-empt packet, and resumption of low priority packet | Control byte ($C_k$) followed by k bytes of pre-empt packet data, followed by resumption of all or part of the remaining pre-empted packet data. | $F5_H$ | $C_k$ | $D_0$ | $D_1$ | ... | ... | $D_{k-1}$ | $C_i$ | S | $D_0$ | ... | $D_{l-3}$ | $D_{l-2}$ | $D_{l-1}$ |

FIG. 1B

| | Frame Type | Frame Contents | Sync Byte | \multicolumn{12}{c}{Data Field, bytes 1-64 in byte fields $P_0$-$P_{63}$} |
|---|---|---|---|---|---|---|---|---|---|---|---|---|---|---|---|
| | | | | $P_0$ | $P_1$ | $P_2$ | ... | $P_{k-1}$ | $P_k$ | $P_{k+1}$ | ... | ... | ... | $P_{61}$ | $P_{62}$ | $P_{63}$ |
| R1 | Data only | Data bytes (D) only | $0F_H$ | $D_0$ | $D_1$ | $D_2$ | ... | $D_{k-1}$ | $D_k$ | ... | ... | ... | ... | $D_{61}$ | $D_{62}$ | $D_{63}$ |
| R2 | End of packet | Control byte ($C_k$) followed by k bytes of data, others are idle (Z) | $F0_H$ | $C_k$ | $D_0$ | $D_1$ | ... | $D_{k-1}$ | Z | Z | ... | ... | ... | Z | Z | Z |
| R3 | End of packet and Start of next packet | Control byte ($C_k$) followed by k bytes of data, final j bytes are data from the next frame. S-byte indicates start of next packet | $F0_H$ | $C_k$ | $D_0$ | ... | ... | ... | $D_{k-1}$ | Z | ... | S | $D_0$ | ... | $D_{j-3}$ | $D_{j-2}$ | $D_{j-1}$ |
| R4 | Idle | Idle bytes (Z) only | $F0_H$ | Z | Z | Z | Z | Z | ... | Z | ... | ... | ... | Z | Z | Z |
| R5 | Start of packet while idle | First k bytes are idle (Z), last j=64-k-1 bytes are data. S byte indicates start of the packet | $F0_H$ | Z | Z | Z | ... | Z | S | $D_0$ | ... | ... | ... | $D_{j-3}$ | $D_{j-2}$ | $D_{j-1}$ |
| R6 | Idle, no sync | Idle bytes (Z) only | $F0_H$ | Y | Z | Z | Z | Z | Z | Z | Z | Z | Z | Z | Z | Z |
| PPR1 | Start pre-empt packet | Data bytes (D) only | $AF_H$ | $D_0$ | $D_1$ | $D_2$ | ... | $D_{k-1}$ | $D_k$ | ... | ... | ... | ... | $D_{61}$ | $D_{62}$ | $D_{63}$ |
| PPR2 | End of pre-empt packet | Control byte ($C_k$) followed by k bytes of pre-empt data, others are idle (Z) | $F5_H$ | $C_k$ | $D_0$ | $D_1$ | ... | $D_{k-1}$ | Z | Z | ... | ... | ... | Z | Z | Z |

FIG. 3

PRE-EMPTION MECHANISM FOR PACKET TRANSPORT

FIELD OF INVENTION

The present invention relates generally to communication systems and more particularly to encapsulation techniques and data packet traffic control methods for communication systems.

BACKGROUND OF THE INVENTION

Digital communication systems provide exchange of data between devices, wherein data bits are typically transferred over a communication medium in groups (packets). For example, in telecommunications or other networked systems, packets of data are transmitted from a source device to a destination device, where the network communication protocol may call for segmentation of a data packet into a number of chunks or frames that are separately transferred to provide services such as internet browsing, voice over IP, digital video, Ethernet, etc. Networks are typically implemented as a series of layers, and described as a multi-layered model, for example, the Open Systems Interconnection (OSI) model, in which a first (lowest) layer is the physical layer at which electrical signals are actually transferred, and a second OSI layer is known as the data link layer that is between the physical layer and a network layer. The main function of the data link layer (layer 2) is to make the physical layer appear to the network layer (layer 3) as a transmission line that is free of transmission errors. In the data link layer, the input data packet is encapsulated into data frames that are then provided to the physical layer in sequence for transmission to the destination device, where the data link layer may also process acknowledgment frames sent back by the receiver.

In most systems, a unit of data being transferred to a destination device is provided from an upper interconnection layer, such as the network layer, to the data link layer, which then forms one or more frames that encapsulate the data packet according to an encapsulation or framing protocol or procedure. The physical layer accepts and transmits a stream of bits regardless of meaning or structure, whereas the data link layer creates or defines frame boundaries, sometimes by using special bit patterns appended to the beginning and/or end of the transmitted frame. In this context, an encapsulation or framing protocol is a group of rules for transferring a data packet across a communication medium to a destination device that verifies whether the data has been successfully received, wherein the protocol is needed to ensure that the destination device can recognize the boundaries of the transmitted packet to identify and decode the contents thereof. In general, it is desirable to maximize data throughput by minimizing the amount of overhead or identification (alignment) bytes that are added to the packet in creating a frame for transmission. Currently, there are many protocols used for transporting packets, including the International Telecommunication Union (ITU-T) standardized General Framing Procedure (GFP), which allows transfer of any type of packet over any media. The GFP protocol, however, suffers from relatively high overhead (e.g., at least six overhead bytes per packet), as well as rather complex synchronization.

Another popular protocol is known as High-level Data Link Control (HDLC, ISO/IEC 3309), which was standardized by the International Telecommunication Union (ITU-T) for packetized data transport in Very High Digital Subscriber Line (VDSL) and Asynchronous Digital Subscriber Line (ADSL) communications. Digital subscriber line (DSL) technology provides high-speed data transfer between two modems across ordinary telephone lines, wherein digital data transfer rates from tens of Kbps to tens of Mbps are supported over standard (e.g., twisted pair) telephone lines, while still providing for plain old telephone service (POTS). ADSL and VDSL have emerged as popular implementations of DSL systems, where ADSL is defined by American National Standard Institute (ANSI) standard T1.413 and ITU-T standards G.992.3, G.992.5, and VDSL is defined by ANSI standard T1.424 and ITU-T standards G.993.1. HDLC is a data link layer encapsulation protocol that allows transport of any type of data packet. However, due to the specific byte-stuffing mechanism introduced to avoid false detection of HDLC frames, the amount of overhead introduced for transmission using HDLC depends on the packet data contents. Because the overhead is variable, however, HDLC was found inappropriate for Ethernet data transport.

More recently, the Institute of Electrical and Electronics Engineers (IEEE) has proposed a new protocol for Ethernet transport over DSL, using 64/65-byte encapsulation, also known as 64B/65B, which has low, stable overhead (1 overhead sync byte per 65 byte frame), where the overhead is largely independent of the packet size and contents. However, the use of the 64B/65B protocol imposes limitations on the size of packets to be transmitted, and thus inhibits adoption of this protocol in situations where a universal protocol is desired for multiple types of services beyond Ethernet. Moreover, the 64B/65B protocol currently does not facilitate efficient transport of packets of different priorities or Quality Of Service (QOS) levels. It is desirable to provide a universal framing protocol for DSL and other communication systems, which supports Ethernet as well as other protocols, such as IP, for instance, and which allows encapsulation or framing of packets of different priorities (usually associated with QOS levels) in an efficient manner.

A capability to prioritize some packets of the transmitted packet stream relative to others is necessary when this packet stream is shared by services with different latency requirements and delay variation requirements. As high-priority packets could be send without waiting until the previously sent low-priority packets are transmitted, various delay-sensitive services, such as voice or video teleconferencing, could be delivered with high quality even through a relatively low-speed access network. Accordingly, there is a need for improved communication data packet encapsulation methods and protocols for use in transferring data in a DSL or other communication system. Also, since Ethernet is currently one of the most widely used protocols, it is desirable that new encapsulation methods will be based on the same principal as the standard IEEE 64B/65B encapsulation to simplify implementations intended to operate universally.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention involves encapsulation protocols or methods for framing packet data for transmission in a communication system, in which low overhead frames are provided with one or a small number M of sync bytes to delineate frame boundaries, along with an N byte data field, wherein the methods provide for encapsulation or framing of short data packets having less than N−1 data bytes as well as longer packets, wherein M and N can be any integers, such as where M=1 and N=64 in one example. The invention provides protocols or methods for encapsulating data from packets of different priorities and pre-emption techniques therefor using fixed length (N+M) byte frames for transmission in a communications system, in which framing or encapsulation of low-priority data can be suspended and then resumed with all or a portion of remaining data from a suspended low-priority data packet being provided in a frame in which a pre-empting higher priority data packet is completed. The invention thus facilitates transfer of low-priority data even in the presence of an intensive stream of higher priority packets by utilizing otherwise unused end portions of frames following the end of a pre-empting packet.

One aspect of the invention provides a method of encapsulating or framing data from prioritized data packets in frames for transport in a communication system. The method comprises forming fixed length N+M byte frames consisting of an integer number M sync bytes indicative of a frame boundary and a data field consisting of an integer number N byte fields, and encapsulating data from data packets in data fields of one or more frames for transportation in the communication system. The method further comprises selectively suspending encapsulation of data from a data packet of a first (e.g., low) priority to encapsulate data from a pre-empting data packet of a second (e.g., higher) priority, and resuming encapsulation of at least a portion of remaining data from a suspended data packet of the first priority in a frame in which a pre-empting data packet of the second priority is completed.

The method may be employed to encapsulate packets of any length, including very long packets relatively to the frame size N+M, and short packets, having a length less than N−1 bytes. In the case of short high-priority pre-empting packets, the pre-empting packet may be started and completed in a single frame, wherein all or a portion of a suspended lower priority packet may be included in the same frame in which the pre-empting data packet starts and completes. In one exemplary implementation, the resumption of the suspended packet comprises providing a control byte in the data field after a final data byte of the preempting data packet, the control byte being indicative of an end of the data bytes of the suspended data packet in the data field. A start byte may also be provided after the control byte and before the data bytes of the suspended data packet, so as to indicate the start of the remaining data bytes of the suspended data packet. Moreover, the sync byte or bytes may themselves indicate that the pre-empting packet completes in the current frame in addition to providing an indication of a frame boundary.

Another aspect of the invention provides a pre-emption method for prioritized encapsulation or framing of data packets in N+M byte frames for transport in a communication system. The pre-emption method comprises selectively suspending encapsulation of data from a low-priority data packet to encapsulate data from a higher priority pre-empting data packet, and resuming encapsulation of at least a portion of remaining data from a suspended low-priority data packet in a frame in which a pre-empting higher priority data packet is completed. The data packets of both priorities can be of any length including short packets having a length less than N−1 bytes, where short preempting (e.g., higher priority) packets may be started and completed in a single frame, in which one or more bytes of a suspended (e.g., lower priority) packet may be provided in the same frame in which the higher priority pre-empting data packet starts and completes.

The following description and annexed drawings set forth in detail certain illustrative aspects and implementations of the invention. These are indicative of only a few of the various ways in which the principles of the invention may be employed.

BRIEF DESCRIPTION OF THE DRAWINGS

FIGS. 1A and 1B provide a table illustrating an exemplary data framing or encapsulation protocol and rules thereof in accordance with one or more aspects of the present invention;

FIG. 3 is a table illustrating a proposed modification to a conventional 64B/65B data encapsulation protocol with proposed rules for pre-emption for framing high-priority data.

DETAILED DESCRIPTION OF THE INVENTION

Figure 2A:
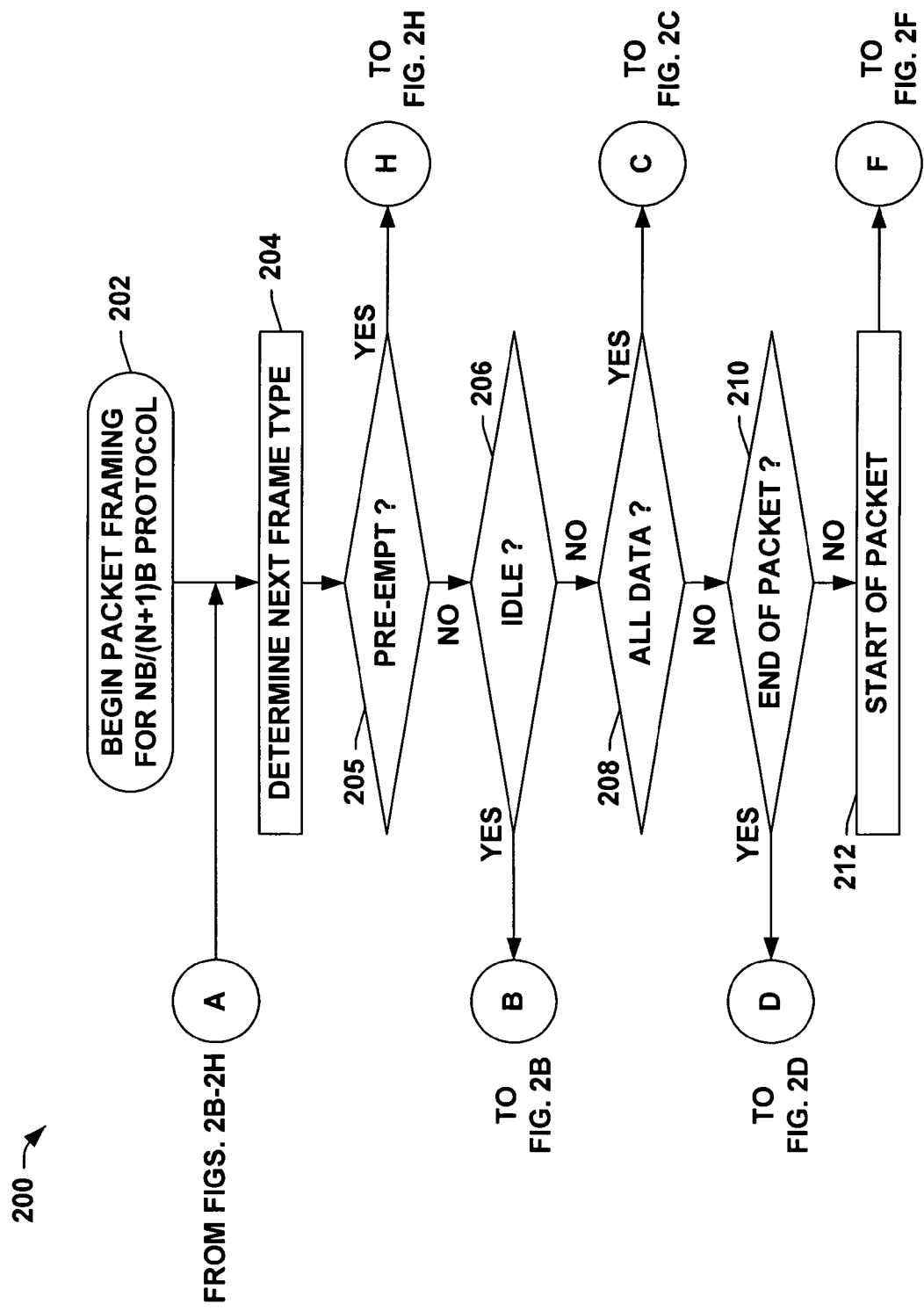
FIGS. 2A-2H provide a flow diagram illustrating an exemplary method of encapsulating data packets according to the present invention.

One or more implementations of the present invention will now be described with reference to the attached drawings, wherein like reference numerals are used to refer to like elements throughout.

The present invention provides framing methods and pre-emption techniques which allow encapsulation of data transferred in packets of different priorities, which may be employed in association with 64B/65B (64/65-octet encapsulation as specified in the IEEE standard 802.3ah) or other low overhead protocols using fixed length N+M byte frames with a small number M (e.g., one or several) sync bytes. The invention, moreover, provides for inclusion of one or more bytes of a suspended (e.g., pre-empted) packet within an encapsulation frame that also includes the completion (e.g., last data byte) of a higher priority preempting packet, so as to more efficiently use the remaining byte locations in the frame (e.g., improving data throughput), as well as to prevent total pre-emption of low-priority data when there are a large number of high-priority packets being encapsulated (e.g., reducing the latency of low-priority data). The invention can be employed for encapsulating data packets of any length, including short packets that are less than N−1 bytes long, and/or longer packets. The invention may provide significant advantages in situations where packet traffic includes long packets with low-priority (e.g., a first priority level) and short packets with higher priority (e.g., of a second priority level).

In conventional 64B/65B protocols, no pre-emption is allowed. In this situation, if the high-priority packet appears when the transmitting modem has already started to transmit a long low-priority packet, the high-priority packet have to wait until transmission is over, or the transmitter will have to abort the low-priority packet and transmit the high-priority packet instead, after which the low-priority message can be re-started.

Referring to FIG. 3, pre-emption mechanisms have been proposed for use in the 64B/65B protocol, wherein the low-priority packet is not aborted, but instead is suspended or interrupted temporarily to send the high-priority packet. The low-priority packet is then resumed when the higher priority packet is completed. FIG. 3 illustrates a conventional IEEE 64B/65B framing protocol 10 in table form, including six basic rules R1-R6 in corresponding table rows, generally in accordance with the IEEE standard IEEE.802.3ah, as well as proposed pre-emption rules PPR1 and PPR2 described further below. The protocol 10 of FIG. 3 defines a standard for Ethernet service for data transport over DSL physical layers, wherein the rules R1-R6 may be used to encapsulate Ethernet packets over a DSL channel using 65 bytes of coded data (e.g., a 65 byte frame) to transport up to 64 bytes of packet data, referred to as 64B/65B encapsulation or 64/65 octet encapsulation.

The Ethernet standard defines the transport of packets over a single channel of a physical layer link, wherein Ethernet packets can carry between 46 and 1500 data bytes, together with 18 bytes of overhead information, including a 6-byte destination address, a 6-byte source address, a 2-byte length/type field, and a 4-byte FCS/CRC field, whereby Ethernet packets vary in size from 64 bytes to 1518 bytes. Accordingly, the encapsulation protocol 10 of FIG. 3 and the rules R1-R6 thereof provide for framing Ethernet packets that are 64 or more bytes using 65 byte frames, where a single sync byte ($0F_H$ or $F0_H$) is provided to indicate the start of each frame, followed by 64 data byte fields in byte positions $P_0$-$P_{63}$, where the subscripts "H" herein indicate hexadecimal values.

Rule R1 in the protocol 10 provides for situations where the entire frame data field is data bytes (e.g., where the start and the end of the transmit packets are both beyond the frame). In this situation, the sync byte has a value of $0F_H$ (00001111 binary), where data bytes $D_0$-$D_{63}$ are provided in the subsequent byte fields at positions $P_0$-$P_{63}$. When no new data packets are ready for encapsulation or framing, the protocol 10 provides for idle frames to be sent according to rules R4 and R6 (R6 is used to indicate that transmission is not synchronized). In both cases, the sync byte has a value of $F0_H$, wherein all the byte fields at positions $P_0$-$P_{63}$ are "Z" in the first case of rule R4, where Z-bytes are idle bytes having a value of $00_H$ (00000000 binary). In the case of non-synchronized idle frames in rule R6, the first byte field at position $P_0$ is a "Y" byte having a value of $D1_H$ (11010001 binary), with the remaining bytes in the frame data field being Z-bytes ($00_H$).

Rules R2 and R3 cover situations in which a previously started packet is completed (e.g., ends) in the current frame, wherein the sync byte has a value of $F0_H$. In accordance with rule R2, a control byte $C_k$ is provided following the sync byte, and the remainder of the data bytes from the previously started packet $D_0$-$D_{k-1}$ are provided in the subsequent byte fields at positions $P_1$-$P_k$ following the control byte $C_k$ which indicates the position $P_k$ at which the packet data ends. The control byte $C_k$ has a value that depends on the number of bytes k being sent from the finished packet in the frame, where k can be 0-63. The control byte value $C_k$ is computed as $k+10_H$ (e.g., k+00010000 binary), where the most significant bit (MSB) of $C_k$ is set such that the resulting value of $C_k$ has even parity (e.g., $C_0=90_H$, $C_1=11_H$, $C_2=12_H$, $C_3=93_H$, . . . $C_{62}=4E_H$, and $C_{63}=CF_H$) In this manner, the control byte $C_k$ indicates the position $P_k$ of the final data byte $D_{k-1}$ of the packet in the frame data field. After the last data byte $D_{k-1}$, the remaining bytes in the frame data field are Z-bytes ($00_H$).

Rule R3 provides for starting the next data packet after the current packet ends in a frame. As in rule R2, a control byte $C_k$ is provided following the sync byte to indicate the position $P_k$ of the final data byte $D_{k-1}$ of the packet that is being completed, where $C_k$ is computed as described above depending on the number of remaining bytes k in the ending packet. Thereafter, zero, one, or more Z-bytes ($00_H$) may be provided following the last data byte $D_{k-1}$, and a start byte S is provided before the initial j data bytes of the next packet $D_0$-$D_{j-1}$. The start byte S has a value of $50_H$ (01010000 binary) and indicates to the receiving device that the data starts in the next byte field (e.g., indicates the beginning of the next packet within the current frame). The 64B/65B protocol further allows cases in which only a start byte S is included in a frame (rules R3 and R5), where the start byte S may be located at the end of the frame, and where the first data byte of the next packet starts in the next frame. It is noted that since the Ethernet packets are limited to sizes of 63 bytes or more, the packet that is ending in rule R3 was started in a previous frame, and the packet that is started in rule R3 is completed in a subsequent frame, wherein the delimiters $C_k$ and S are used to indicate the packet end and start positions, respectively, such that a device receiving the frame can ascertain where the data is and thus differentiate between the two packets. Rule R5 illustrates the case where a packet is started within a frame after zero, one or more Z-bytes, wherein a start byte S is provided prior to the first data byte $D_0$ as in rule R3 above.

As can be seen in FIG. 3, the 64B/65B protocol 10 has low, stable overhead (e.g., only 1 overhead sync byte per 65 byte frame), where the overhead is independent of the packet size and contents. However, the conventional protocol 10 is limited to use with Ethernet or other packet types having lengths of 63 bytes or more. Accordingly, while the conventional 64B/65B encapsulation 10 provides for generally low overhead, it cannot be used for transport of short packets of less than 63 bytes, unless short packets are artificially delayed to be placed over the boundary line between two subsequent frames. This clearly reduces efficiency of the protocol and leads to additional delays, which may not be appropriate, for example, to provide for delay sensitive transmission of short packets for voice over IP or other services. In DSL and other types of communication systems, it is desirable to provide low, stable overhead while transferring data of different packet sizes, wherein the minimum packet size constraints of the conventional 64B/65B protocol 10 limit its applicability in such situations.

The proposed pre-emption rules PPR1 and PPR2 in FIG. 3 provide one mechanism for prioritized encapsulation of packets of different priorities in 65 byte frames. When a high-priority packet appears during transmission of a lower priority packet, the transmitter completes the current 64-byte frame with data bytes of low-priority packet (e.g., per rule R1), and then starts the higher priority pre-empting packet in the next 64-byte frame which has a special sync byte. The last frame of the pre-empting packet is sent and is marked by a different sync byte and the position of the end of the pre-empting packet is marked by the control byte $C_k$. In accordance with the proposed rule PPR1, high-priority pre-empting packets start at the beginning of a new frame, where the sync byte is $AF_H$ (10101111 binary), and the remaining byte positions $P_0$ through $P_{63}$ of the frame data field are filled with the high-priority data $D_0$ through $D_{63}$. Subsequent frames carrying data from the high-priority pre-empting packet are carried in similar frames beginning with $AF_H$ sync bytes. As illustrated in proposed rule PPR2, when the last frame of pre-empting packet data is reached, a different sync byte $F5_H$ (11110101 binary) is used, followed by a control byte $C_k$ in position $P_0$ and the final preempting data bytes $D_0$ through $D_{k-1}$ at positions $P_1$ through $P_k$, in which $C_k$ has a value that indicates the position of the last pre-empting packet data byte. In the proposed protocol of FIG. 3, the remaining data field positions are filled with Z bytes ($00_H$) following the final pre-empting packet data byte in the frame in which the pre-empting packet completes or ends. The low-priority packet is resumed from the beginning of the next 64-byte frame.

While the proposed encapsulation protocol 10 of FIG. 3 provides a pre-emption mechanism by virtue of the proposed rules PPR1 and PPR2, this proposal suffers from at least two shortcomings. First, the proposed protocol 10 of FIG. 3 does not allow short pre-empting packets, since the first pre-emption frame (rule PPR1) is assumed to be completely filled. Thus, all pre-empting packets in the proposal 10 must be greater than or equal to 64 bytes long. In addition, the proposed protocol 10 inherently introduces a gap (e.g., the idle Z-bytes) between the end of the preempting packet and resumption of the suspended low-priority packet in the next frame. This reduces the data throughput each time a preempting packet completes before the end of a frame. Moreover, this gap may inhibit the ability to resume a suspended low-priority packet right after the high-priority packet is completed, and thus may unreasonably delay the resumption. For example, where many high-priority pre-empting packets are present, the low-priority message may be suspended for very long time using the proposed protocol 10 of FIG. 3. This delay or latency may become unacceptable even when the type of service supported by the low-priority data does not specifically require low data latency (e.g., web browsing, etc.).

Referring now to FIGS. 1A and 1B, the present invention provides framing and pre-emption techniques for encapsulating data from packets of different priorities using (N+M) byte frames for transmission in a communications system. In the following examples, the various aspects of the invention are illustrated and described in the context of modifications to the conventional 64/65-byte (64B/65B) framing protocol. However, the invention may be implemented in association with any such low overhead frame types, such as N/(N+M)-byte frames (e.g. fixed length N+M bytes long) having an integer number M sync bytes and a data field having an integer number N data byte fields, wherein all such implementations are contemplated as falling within the scope of the invention and the appended claims. The methods of the invention provide for suspending encapsulation of low-priority data packets to encapsulate a higher priority pre-empting data packet, and resuming encapsulation all or a portion of remaining data from a suspended low-priority data packet in a frame in which a pre-empting higher priority data packet is completed. In the exemplary implementation of the invention both the above-mentioned disadvantages of the proposal of FIG. 3 are overcome or mitigated by usage of short packet encapsulation techniques, which also generally facilitate framing of packets that are less than N−1 bytes long. However, other implementations are possible wherein only longer packets are supported, wherein all such alternate implementations are contemplated within the scope of the invention and the appended claims.

Referring now to FIGS. 1A and 1B, the present invention provides methods and protocols for data encapsulation which can be employed in framing data packets of any length and of different priorities, while allowing the benefits of the above 64/65-byte and other N/(N+1)-byte frames, including low overhead and compatibility with Ethernet packets and other larger packets. In this regard, although illustrated and described in FIGS. 1A and 1B in the context of 65-byte frames having a single sync byte at the beginning of each frame, the present invention may be employed with frames of other lengths, wherein a single or a small integer number M sync bytes (or other frame boundary indicating bytes) are used to delineate frame boundaries, for example, such as N/(N+M)-byte frames having a length of (N+M) bytes, for example, where M is 1 or 2, and N is a positive integer greater than M. The illustrated examples include various control bytes indicating the end of certain packet of data within a frame, wherein such control information may be made larger than a byte if the frame size is increased such that N is greater than 256. In general, the benefit of using higher values of N is smaller overhead, although frame delineation may be less robust for higher values of N.

FIGS. 1A and 1B illustrate an exemplary implementation of one or more aspects of the invention, in which 65-byte frames are used with a single sync byte at the beginning of the frame (N=64, M=1) for encapsulating data from packets that may be of any length (e.g., less than, equal to, or greater than 63 bytes). An exemplary protocol 100 is illustrated in FIGS. 1A and 1B in accordance with the invention, in which eleven framing or encapsulation rules R1-R11 are provided in corresponding table rows, with the first 6 rules R1-R6 being the same as in the 64B/65B protocol 10 of FIG. 3. By including the rules R1-R6, the exemplary protocol 100 provides a modified 64B/65B implementation that is completely backward compatible with the conventional protocol 10, for example, allowing support for Ethernet packets (which are all equal or longer than 64 bytes) or any other packets of 63 or more bytes.

In addition, the exemplary protocol 100 of FIG. 1 also provides for encapsulation of shorter packets (e.g., less than 63 bytes in length) alone or in combination with support for longer packets of 63 or more bytes per the rules R7 and R8 whereby the packet size is essentially decoupled from (e.g., independent of) the number of byte fields N in the frame data field. Further, the protocol 100 provides for pre-emption by higher priority data packets of any length in accordance with rules R9-R11. The exemplary encapsulation protocol 100 and other protocols of the invention thus facilitate universal framing for a variety of communication types and services, for example, that can advantageously be employed in DSL or other communication systems to support a variety of different services, including but not limited to Ethernet, internet browsing, voice over IP, digital video, etc., and that can also provide prioritized transmission of large amounts of important data in an efficient manner without completely inhibiting the transfer of lower priority data.

Rule R7 in FIG. 1A is directed to the situation in which a pending packet ends and one or more short packets are started and ended within a frame. To finish transferring the remainder of the pending packet, a control byte $C_k$ is provided after an $F0_H$ sync byte, where k indicates the number of remaining bytes for the ending packet, similar to the case of rule R3 described above. The remaining k data bytes from this pending packet $D_0$-$D_{k-1}$ are then provided in the subsequent byte fields at positions $P_1$-$P_k$ in the frame data field following the control byte $C_k$, where $C_k$ indicates the location of the end of the data from the pending packet. Another control byte $C_i$ is provided in position $P_{k+1}$ in this example after the final data byte $D_{k-1}$ of the previous packet, which indicates the end of the next (e.g., short) packet to be inserted in the frame data field. In general, the control byte $C_i$ can be inserted at any pre-defined location in the frame, such as between the end of the packet that is finishing and the start of the next packet. In this regard, the illustrated implementation provides for locating the control byte $C_i$ an integer number X bytes after the end of the previous packet, where X is a pre-defined number. For example, where X=0, the control byte $C_i$ is provided immediately after the previous packet. In another possible implementation, the control byte $C_i$ can alternatively be provided an integer number X bytes before the start of the next packet. In this case, with X=0, the control byte $C_i$ is located immediately before S, or the control byte $C_i$ can itself indicate the start of the next packet (e.g., with no separate start byte S), wherein other such alternative implementations are also possible.

As with the first control byte $C_k$, the control byte $C_i$ for the short packet is computed as $i+10_H$ (e.g., k+00010000 binary) in the illustrated implementation, where the most significant bit (MSB) of $C_i$ is set such that the resulting value of $C_i$ has even parity, whereby the control byte $C_i$ indicates the position of the final data byte $D_{q-1}$ of the q-byte short packet in the frame data field. Other implementations are possible, wherein the control byte $C_i$ is computed in any manner that allows unambiguous identification of the end of the packet. Zero, one, or more Z-bytes ($00_H$) may be inserted before or may follow after the $C_i$ control byte, depending on the value of X used (in the illustrated example X=0), and a start byte S ($50_H$) is provided to indicate the beginning of the short packet data, beginning in the next byte field (e.g., at position $P_n$ in FIG. 1A). The short packet data $D_0$-$D_{q-1}$ is then provided in the byte fields following the start byte S, where the last such data byte $D_{q-1}$ is located in the position indicated by the control byte $C_i$, with the remaining byte fields of the frame being filled with Z-bytes ($00_H$). In this implementation, i is the number of bytes from the beginning of the frame data field to the last byte of the data for the packet following the corresponding $C_i$ control byte.

It is noted that further short packets may be provided in the frame per rule R7, with a corresponding control byte $C_i$, optionally followed by one or more Z-bytes, with an S byte preceding the corresponding data bytes thereof, where the frame can either end with a data byte or a Z-byte. Also, a partial packet, whether short or long, could be started in the frame after the completed short packet within the scope of rule R7 (e.g., similar to the above rule R3), wherein one or more Z-bytes ($00_H$) may be provided following the last data byte $D_{q-1}$ of the completed short packet, and a start byte S is provided before the initial data bytes of the next packet, which itself will end or be completed in a subsequent frame or frames.

Rule R8 provides for inserting one or more short packets in a frame that does not include the end of a previous packet. In this case, one or more short packets are provided in the frame data field using corresponding control bytes $C_i$ to indicate the packet ends and start bytes S to indicate the beginning of the data bytes of the packets. Alternatively or in combination, a partial packet can be provided at the end of the frame, with a corresponding start byte S preceding the partial data, without a corresponding control byte $C_i$ (e.g., which may be thought of as providing a control byte $C_i$ having a value that is equal to that of an idle byte Z). Moreover, as illustrated in FIG. 1A, zero, one or more Z-bytes may optionally be situated between corresponding control and start bytes $C_i$ and S, respectively, (e.g., the start byte S may be immediately preceded by the control byte $C_i$). As another variation under rule R8 in the exemplary 64B/65B protocol 100, a short packet may begin after an idle period, in which case, one or more Z-bytes may follow the sync byte, after which a control byte $C_i$ will be provided to indicate the end position of the last data byte of the corresponding first packet. As described above, a start byte S will precede the first byte of the data for packets beginning in the frame, where one or more optional Z-bytes may, but need not, be provided between the control byte $C_i$ and the start byte S.

Thus, the provision of the rules R7 and R8 in the exemplary protocol 100 allows short packets to be encapsulated (e.g., packets with fewer than 63 data bytes), where the rules R1-R6 provide support for Ethernet or other larger packets having more than 63 data bytes, whereby the packet length is no longer dependent upon the number of byte fields in the frame data field. Although illustrated and described above for the case of a 65-byte frame with a single sync byte, other implementations are possible using larger or smaller frames for N/(N+M)-byte applications, where the frames consist of an integer number N data byte fields and an integer number M delineation (e.g., sync) bytes, where support is provided for encapsulation of short packets having less than 63 bytes as well as larger packets. Further, whereas i is the number of bytes from the beginning of the frame to the last byte of the data for the packet following the corresponding $C_i$ control byte in the exemplary protocol 100, the value $C_i$ may instead indicate the end of the packet data where i is the length of the packet (counted after the S-byte) or the length of the packet plus the optional inter-packet gap (e.g., Z-bytes) plus 1 byte, or any other algorithm to identify the end of the data in the frame. However, it is noted that in the illustrated implementation of the protocol 100, the computation of the $C_i$ values uses the same algorithm used for the computation of Ck control bytes of Rules R2 and R3, whereby the illustrated example may be easier to implement.

In addition, it is noted that in the exemplary protocol 100, the $C_i$ control bytes may be provided at any location between the end of the previous packet and the start byte S of the next packet, wherein the particular location may be pre-defined in certain implementations. One possible alternative implementation is to place the control byte $C_i$ immediately prior to the corresponding start byte S for a short packet, wherein the control byte $C_i$ is set to Z ($00_H$) if the packet ends or completes beyond the boundary of the current frame. This case is very convenient for "pipeline" implementation, when a control byte $C_i$ is inserted just when we get a packet to send (in the previous case we need first to buffer the whole packet). Yet another alternative implementation could be to place a control byte $C_i$ instead of a start byte S if the end of the packet is inside the frame, while using a $C_i$ as computed above. One or more Z-bytes may be set between the $C_i$ and the end of the previous packet. This case may be convenient for implementation, but may slightly increase the probability of false detection of the start of the packet compared with the illustrated implementation of the protocol 100 that uses a fixed start byte value of $50_H$.

Referring to FIG. 1B, the protocol provides rules R9-R11 to support suspension of low-priority packets for pre-emption by higher priority packets, along with resumption of the low-priority packets using spaces in the frames in which the pre-empting data packets complete. In accordance with rule R9 in the protocol 100, the first frame carrying a pre-empting packet begins with a control byte $C_k$ that indicates the location of the end of the pre-empting packet if it is short, and is a Z-byte if the pre-empting packet is N-1 bytes or longer. Thus, the preempting packets may be of any length in the exemplary protocol 100, although not a strict requirement of the invention. As illustrated in rule R9, for a long pre-empting packet (e.g., longer than 62 bytes), an $F5_H$ sync byte (e.g., 10101111 binary) is provided, followed by a Z byte in the data field position $P_0$. The remaining byte positions $P_1$ through $P_{63}$ are filled with the high-priority data $D_0$ through $D_{62}$. Referring also to rule R10 in FIG. 1B, subsequent frames carrying data from the high-priority pre-empting packet are carried in similar frames beginning with $AF_H$ sync bytes, with no control byte. In this case, the continuing data $D_0$ through $D_{63}$ from the long preempting packet is provided in positions $P_0$ through $P_{63}$. In some implementations, a start byte S may precede the preempting packet with possible Z-bytes between $C_k$ and S. This may simplify the implementation by using a consistent pattern for a packet started right after the sync byte.

Referring also to rule R11, the exemplary protocol 100 also provides for resuming encapsulation of all or a portion of remaining data from a suspended or pre-empted lower priority data packet in a frame in which a pre-empting data packet is completed (e.g., in a frame that includes the last data byte of the pre-empting packet). In the pre-emption features of the protocol 100, many different scenarios can arise, where a low-priority packet is interrupted or pre-empted with one or more remaining bytes which have not been transmitted. Such remaining bytes are a portion of the original low-priority packet, but together may number less than N-1 bytes (e.g., short remainder) or may be greater than or equal to N-1 bytes (e.g., long remainder). Where possible, the protocol 100 provides for resuming transmission of the suspended packet by inclusion of at least some of the remainder bytes in the frame the preempting packet completes. In this manner, the space at the end of such a pre-empting packet ending frame is not wasted as was the case in the proposal 10 of FIG. 3 above. Furthermore, this feature allows small portions of the suspended remainder to be inserted and transmitted at a reduced data rate in situations where there is a sequence of pre-empting packets. Thus, even where the next frame is used to begin another pre-empting packet, the current frame may advantageously contain at least some lower priority data, whereby the low-priority data rate is not reduced to zero, and the total data throughput (e.g., efficiency) of the system is maintained to a certain extent. In some implementations several short preempting packets may be concatenated into a longer one, in which case the principals of invention shill hold relative to the mentioned longer packet.

In accordance with rule 11 of FIG. 1B, when the last frame of a pre-empting packet data is reached (e.g., the final data bytes of a pre-empting packet will fit in the current frame, and thus the pre-empting packet will end or complete in the current frame), a different sync byte $F5_H$ (11110101 binary) is placed at the beginning of the frame, which is followed by a control byte $C_k$ in position $P_0$ to indicate the position of the final pre-empting packet data byte in the frame. In the example of FIG. 1B, the final pre-empting data bytes $D_0$ through $D_{k-1}$ are placed at positions $P_1$ through $P_k$ in the data field in which $C_k$ has a value that indicates the position of the last pre-empting packet data byte. For example, this control byte $C_k$ may be computed as described above according to the number of remaining pre-empting data bytes, or the control byte $C_k$ may otherwise indicate the position of the last preempting data byte.

This completes the current pre-empting packet, which may have started in a previous frame or which may have also started in the current frame (e.g., a short pre-empting packet). In either case, if sufficient byte fields remain in the current frame, another control byte $C_i$ is provided in the data field after the final data byte of the pre-empting data packet (e.g., at position $P_{k+1}$ in the illustrated example), followed by a start byte S (e.g., $50_H$) and one or more remaining data bytes (e.g., $D_0$ through $D_{i-1}$ in this example) from the suspended low-priority packet, where the control byte $C_i$ is indicative of an end of the data bytes of the suspended data packet and the start byte S is indicative of the start of the data from the suspended packet in the data field. The control bytes $C_i$ and the start byte S can be of any values that indicate the end and the beginning of the remainder data, respectively, in the current frame. For example, the control byte $C_i$ may be computed as described above or by other suitable formula based on the location of the last remainder byte in the current frame.

Various alternative implementations are possible, for example, wherein one or more Z-bytes are optionally provided between the control byte $C_i$ and the last pre-empting data byte $D_{k-1}$, between the control and start bytes $C_i$ and S, and/or between the start byte S and the first remaining data byte $D_0$ of the suspended packet, wherein all such alternative implementations are contemplated as falling within the scope of the invention and the appended claims. Moreover, as the number of remaining low-priority data bytes may be small, it is possible that the remainder data will not extend to the final frame position $P_{63}$, in which case the final positions may be filled with Z-bytes. Furthermore, if the end of the remainder data is beyond the current 64-byte frame (e.g., the remaining low-priority suspended data will not fit in the current frame), the control byte $C_i$ is set to Idle (Z-byte). In another case, the remainder data from the suspended low-priority packet may complete in the current frame, and there may be enough space left to begin another packet, in which case yet another control byte, start byte, and data bytes may be inserted according to the above short packet rules (e.g., R8).

Referring also to FIGS. 2A-2H, an exemplary packet framing or encapsulation method 200 is hereinafter illustrated and described, in accordance with the invention. While the method 200 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with any type or form of communication system, including but not limited to DSL systems. For instance, the method 200 is illustrated and described hereinafter for a general case where the frames have a frame data field consisting of an integer number N byte fields, with a single sync byte (e.g., a N/(N+1)-byte protocol), although the method 200 and other methods of the invention are applicable using any N/(N+M)-byte protocol, where N and M are positive integers, with N being greater than M, and where M is typically a small number, such as 1 or 2. In this regard, although the exemplary protocol 100 of FIGS. 1A and 1B is referenced at various points in the following discussion of the general method 200 for illustrative purposes, the method 200 and other methods of the invention are not limited to the exemplary protocol 100 or to 64B/65B implementations.

Beginning at 202 in FIG. 2A, a determination is made at 204 as to the type of the next frame to be constructed. Depending upon the next packet, if any, to be encapsulated or framed, determinations or decisions are thereafter made at 206-212 as to which of the protocol rules R1-R11 (FIGS. 1A and 1B) will be employed in constructing the next frame. At 205, a determination is made as to whether a higher priority packet is pre-empting transmission of a lower priority packet. If so (YES at 205), the method 200 proceeds to FIG. 2H, wherein the low-priority packet is suspended or pre-empted for encapsulation of the pre-empting packet, and then later resumed in whole or in part, in accordance with the exemplary rules R9-R11, as described further below. Otherwise (e.g., NO at 205), a determination is made at 206 as to whether the next frame is to be an idle frame. For instance, if the next packet is not yet available, the frame will be an idle frame (YES at 206), and the method 200 proceeds to FIG. 2B as discussed below. If the next frame is not an idle frame (NO at 206), a determination is made at 208 as to whether the next packet will be all data. For example, more than N data bytes may remain from a previously started (e.g., pending) packet, in which case (YES at 208), the method 200 proceeds to FIG. 2C as described below. Otherwise (NO at 208), a determination is made at 210 as to whether the next frame will include the end of a pending packet. If so (YES at 210), the method 200 proceeds to FIG. 2D as described further below, and if not (NO at 210), the next frame is determined at 212 to include the start of the next packet, and the method 200 proceeds to FIG. 2F.

Figures 2B, 2C:
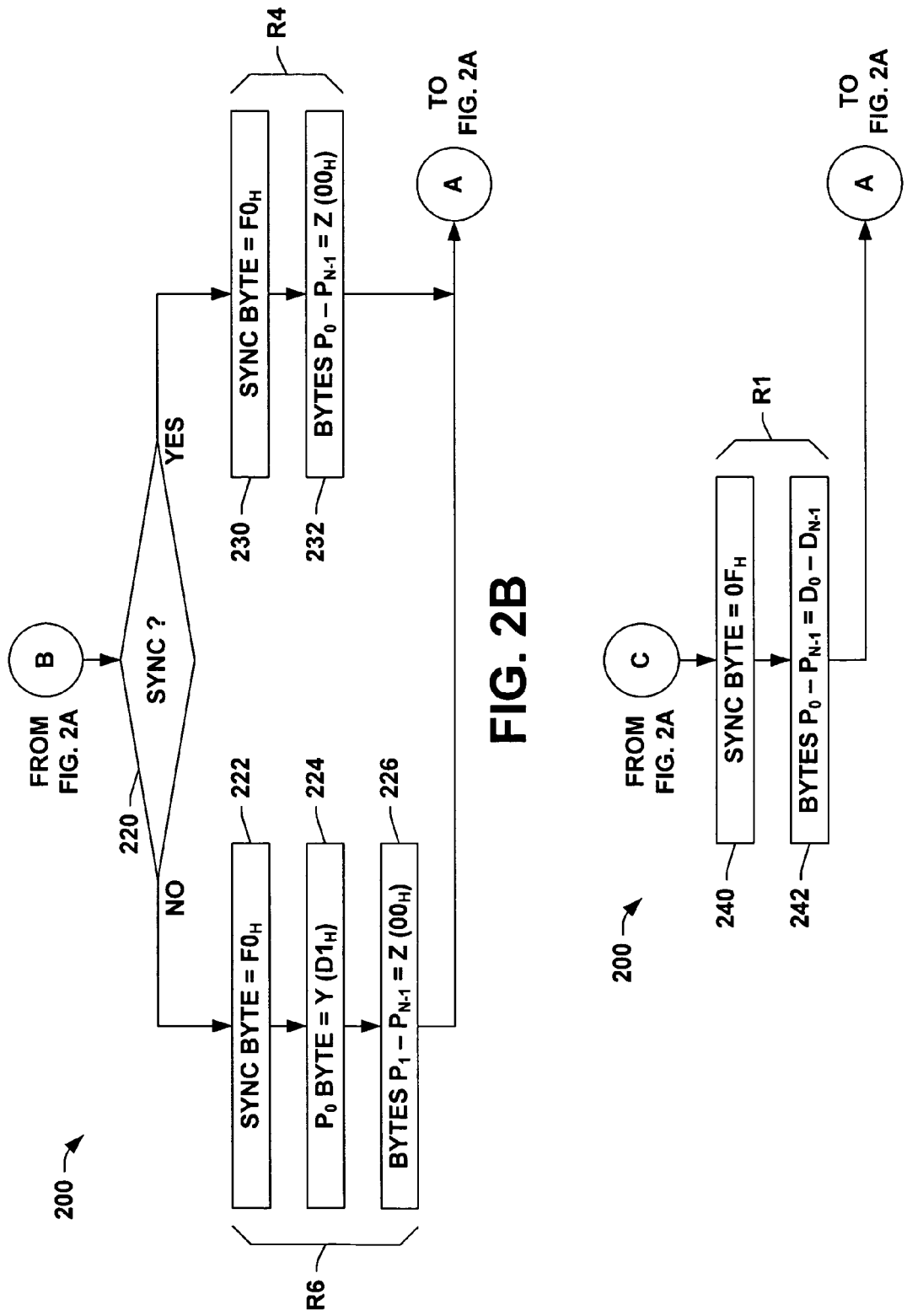

Referring initially to FIGS. 2A and 2B, if it is determined that the next frame is to be an idle frame (YES at 206 in FIG. 2A), the method 200 proceeds to 220 in FIG. 2B, where a determination is made as to whether the communication system is synchronized or not. If the receive state machine is out of sync (NO at 220), the frame is constructed at 222-226 (e.g., rule R6 of FIG. 1A). In this case, a sync byte (F0$_H$) is provided at 222 at the beginning of the frame, a Y byte (D1$_H$) is provided at 224 in the first byte field at location P$_0$ in the frame data field, and the remaining byte fields (P$_1$-P$_{N-1}$) are provided with Z-bytes (00$_H$) at 226, after which the method 200 returns to 204 in FIG. 2A to create the next frame. In the case where the system is in sync (YES at 220 in FIG. 2B), the frame is instead created at 230 and 232 (e.g., rule R4 of FIG. 1A), where the sync byte (F0$_H$) is provided at 230, and all the data byte fields are provided with Z-bytes at 232 (00$_H$), before the method 200 returns to 204 in FIG. 2A.

Referring now to FIGS. 2A and 2C, in the case where an "all data" frame is to be constructed (YES at 208 in FIG. 2A), the method 200 proceeds (e.g., according to rule R1 of FIG. 1A) at 240 and 242 in FIG. 2C, where a sync byte having a value of 0F$_H$ is provided at 240, after which the entire frame data field is filled with packet data bytes at 242, before the method 200 returns to 204 in FIG. 2A to begin the next frame.

Figure 2D:
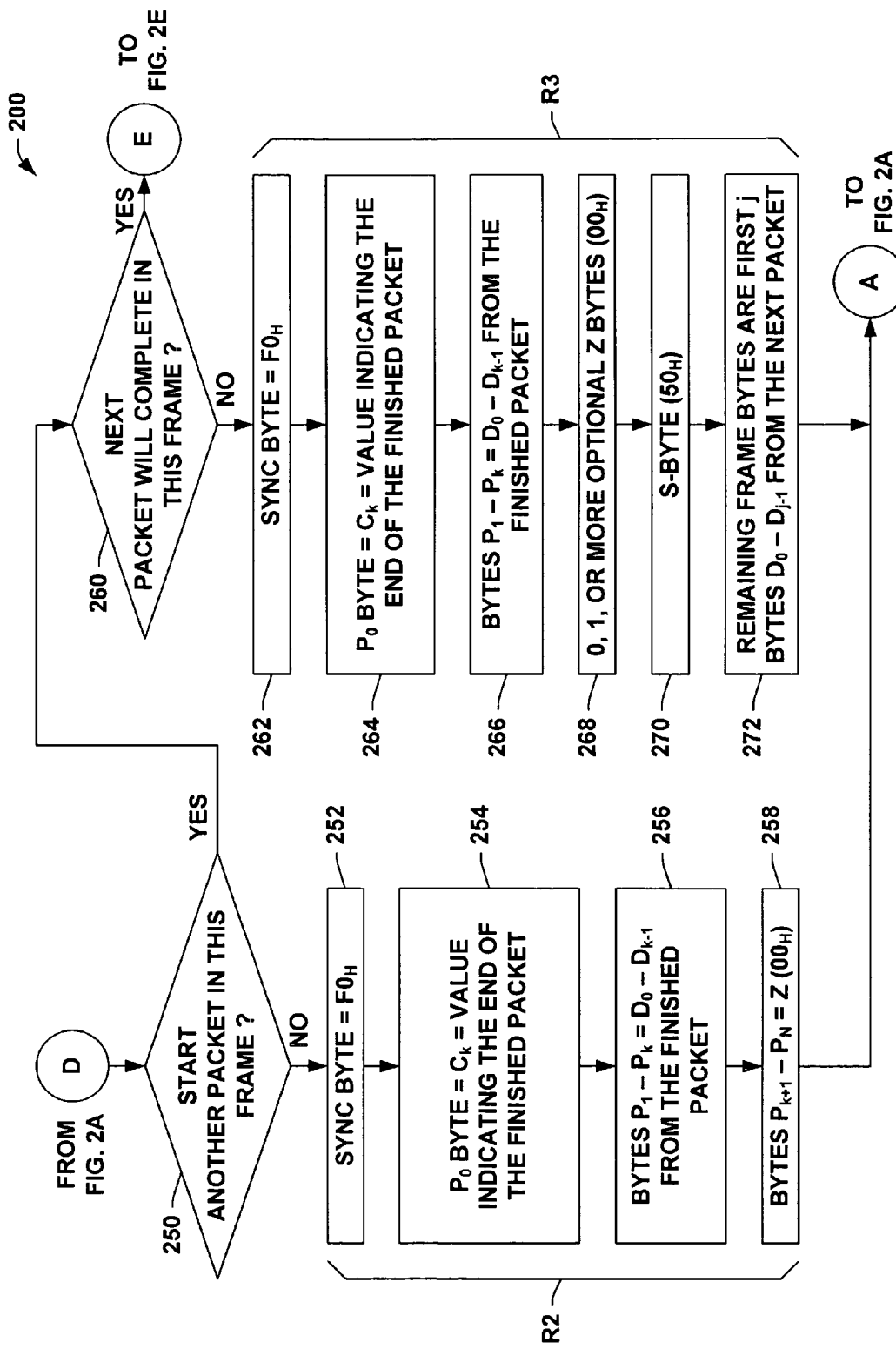
Figure 2E:
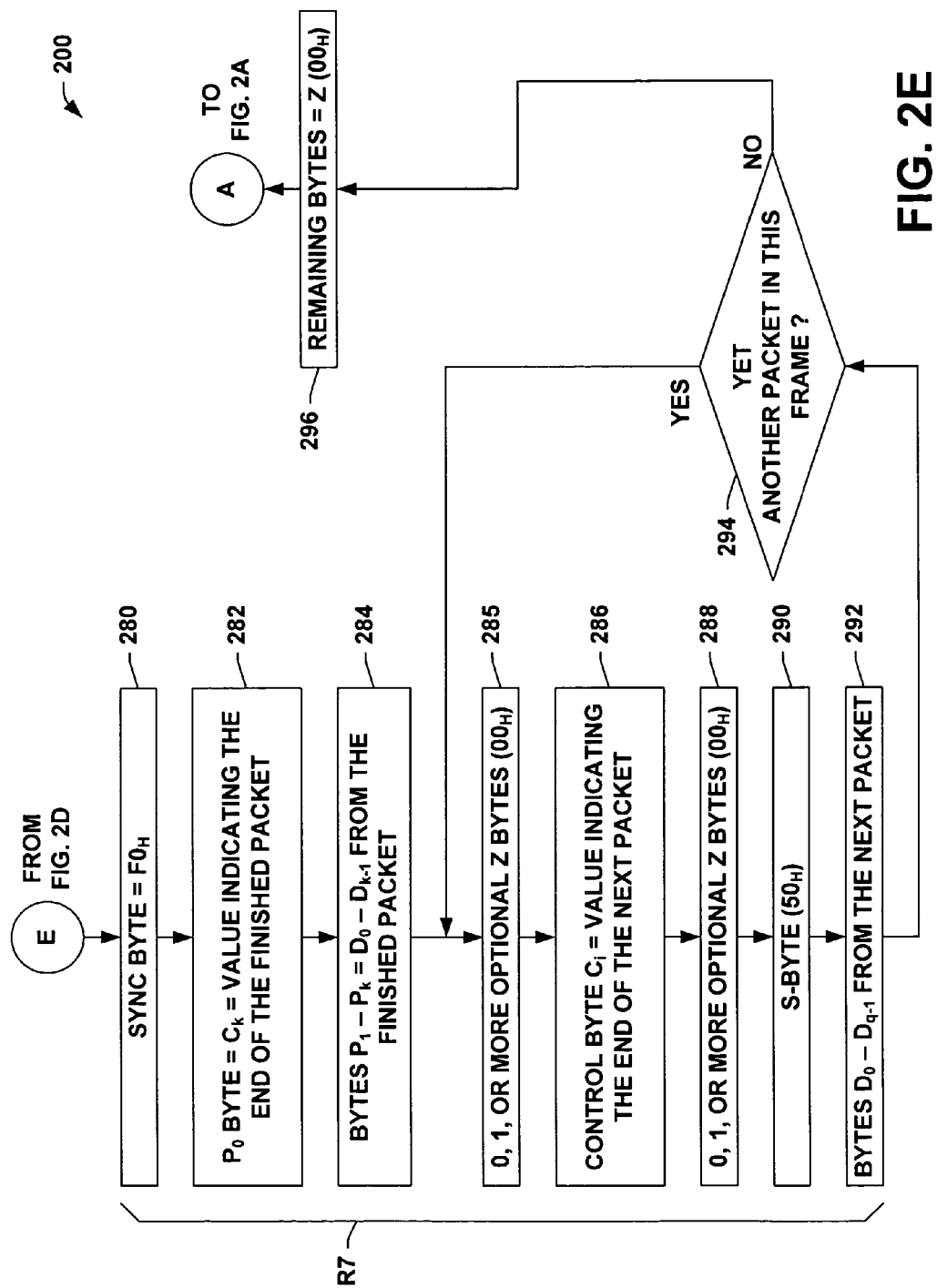

Referring now to FIGS. 2A, 2D, and 2E, in the case where a packet will end in the current frame (YES at 210 in FIG. 2A), the method 200 proceeds according to one of the rules R2, R3, or R7 as illustrated in FIGS. 2D and 2E. At 250 in FIG. 2D, a determination is made as to whether the next packet will begin in the frame. If not (NO at 250), the current frame is constructed at 252-258 (e.g., according to rule R2 of FIG. 1A). At 252, a sync byte having a value of F0$_H$ is provided at 252, and a control byte C$_k$ is provided at 254 in the first byte location (P0) of the frame data field, where the control byte C$_k$ is indicative of the end of the subsequent corresponding data bytes. In the exemplary protocol 100 of FIGS. 1A and 1B, the control byte C$_k$ is computed as k+10$_H$ (e.g., k+00010000 binary), where the most significant bit (MSB) of C$_k$ is set such that the resulting value of C$_k$ has even parity, although other control bytes can be used which somehow indicate the end of the packet data bytes within the frame. Thereafter at 256, the remaining data bytes D$_0$-D$_{k-1}$ from the current packet are provided in the corresponding byte fields P$_1$-P$_k$ of the frame data field, with any remaining byte fields being filled with Z-bytes (00$_H$) at 258 before the method 200 returns to 204 in FIG. 2A to create another frame.

Where another packet will begin in the current frame (YES at 250 in FIG. 2D), a determination is made at 260 as to whether the next packet will complete in the current frame (e.g., whether the next packet is a short packet having less than N−1 bytes of data that will fit in the remaining space of the current frame). If not (NO at 260), the current frame is created at 262-272 of FIG. 2D, including the remaining portion of the current packet and the beginning portion of the next packet (e.g., rule R3 of FIG. 1A). In this case, a sync byte having a value of F0$_H$ is provided at 262, and a control byte C$_k$ is provided at 264 in the first byte location (P0) of the frame data field, where the value of the control byte C$_k$ may be computed at 264 using the above described formula or other suitable technique to indicate the end of the subsequent corresponding data bytes from the pending packet. The remaining data bytes D$_0$-D$_{k-1}$ from the current packet are provided at 266 in the corresponding byte fields P$_1$-P$_k$. One or more optional Z-bytes (00$_H$) may (but need not) be provided after the last data byte D$_{k-1}$ at 268, and a start byte S (50$_H$) is provided at 270 to indicate the beginning of the data from the next packet. At 272, the initial data bytes from this next packet are provided in the remaining byte fields to complete the current frame, before the method 200 returns to 204 in FIG. 2A to begin the next frame.

In the case where the next packet is short (e.g., less than N−1 bytes) and will complete in the current frame (YES at 260 in FIG. 2D), the method 200 proceeds to FIG. 2E, where the current frame is created at 280-296 (e.g., rule R7 of FIG. 1A). A sync byte is provided at 280 having a value of F0$_H$, and a control byte C$_k$ is provided at 282 to indicate the end of the remaining data from the pending packet (e.g., C$_k$ computed as described above or using other suitable techniques). At 284, the remaining data bytes D$_0$-D$_{k-1}$ from the current packet are provided, and zero, one or more optional Z-bytes may be provided following the last data byte D$_{k-1}$ at 285.

At 286 in FIG. 2E, a control byte C$_i$ is provided to indicate the end of the next packet in the current frame (e.g., where C$_i$ may be computed as described above or other suitable technique), wherein the control byte C$_i$ may be followed by zero, one or more optional Z-bytes (00$_H$) at 288. Thereafter, a start byte S is provided at 290 (50$_H$) to indicate the beginning of the data bytes D$_1$-D$_{q-1}$ for the next frame, which are then provided in the frame data field at 292. A determination is made at 294, as to whether yet another short packet is to be provided in the current frame. If so (YES at 294), the method proceeds to 285-292 as described above, to provide another short packet in the frame data field, including a control byte C$_i$ indicating the end of the packet and a start byte S indicating the beginning of the packet data, where zero, one or more optional Z-bytes (00$_H$) may be provided prior to the control byte C$_i$. Otherwise (NO at 294), the remaining byte fields are filled with Z-bytes (00$_H$) at 296, and the method 200 returns to 204 in FIG. 2A for creating the next frame. As discussed above, a partial packet, whether short or long, could be started in the frame after the completed short packet within the scope of rule R7 (e.g., similar to the above rule R3), wherein one or more Z-bytes (00$_H$) can be provided following the last data byte D$_{q-1}$ of the completed short packet, and a start byte S is provided before the initial data bytes of the next packet, which itself will end in a subsequent frame.

It is noted that the method 200 is illustrated in FIGS. 2A-2G in the form of a logic diagram to illustrate the various aspects of the invention in the context of the rules R1-R11 of FIGS. 1A and 1B. However, it is appreciated that state machines, software, or other logic systems may be constructed to implement the various rules R1-R11 according to the invention, wherein the decisions on which rule to employ for a given frame need not be made prior to constructing the frame, where one or more such decisions may be made during frame construction after a potion of the frame has been structured. For example, if a packet is ending in a given frame, as in FIGS. 2D and 2E, the portion of the frame involving the finished packet may be constructed through provision of a sync byte (252, 262, or 280), a corresponding control byte C$_K$ (254, 264, 282), and the corresponding data bytes (254, 266, 284), with the determinations as to whether another packet is to begin in the current frame (250 in FIG. 2D) and whether such a packet will complete in the current frame (260 in FIG. 2D) being made as the information needed to make such determinations becomes available. In this regard, the implementation of the various steps illustrated in FIGS. 2A-2G may be such that pipelining or other logic circuit minimizations are done to minimize redundancy or other optimizations are undertaken whereby the acts required in more than one of the exemplary rules R1-R11 may be undertaken in a single portion of the state machine or logic circuit, wherein all such implementations are contemplated as falling within the scope of the invention and the appended claims.

Figure 2F:
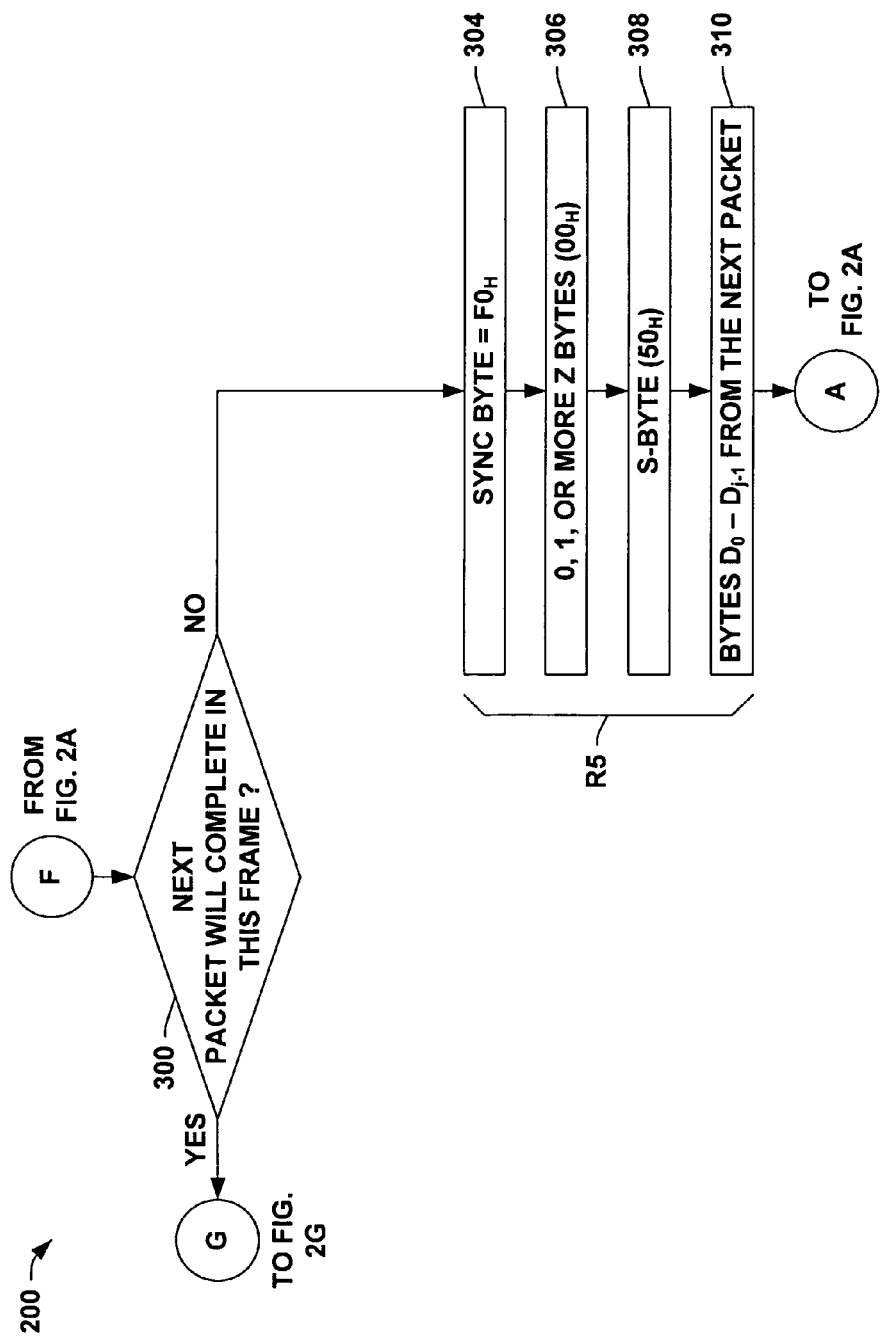
Figure 2G:
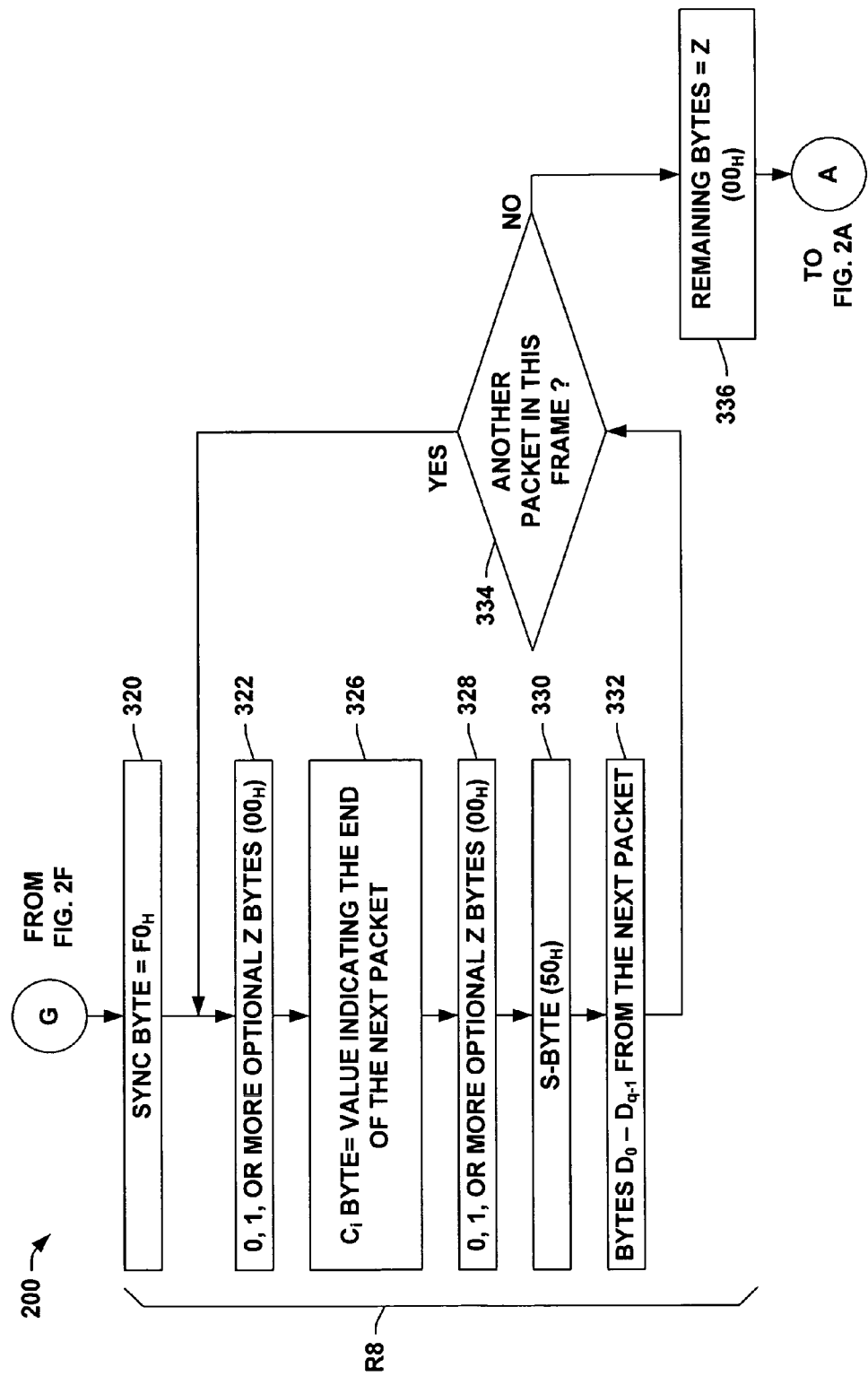

Referring now to FIGS. 2A, 2F, and 2G, in the case where the next frame is to include the beginning or start of a packet (212 in FIG. 2A), the method 200 proceeds to 300 in FIG. 2F.

A determination is made at 300 as to whether the next packet will complete in the current frame (e.g., whether the next packet is a short packet of less than N−1 bytes). If not (NO at 300, indicating the next packet is greater than or equal to N−1 bytes in length), the frame is created at 304-310 in FIG. 2F (e.g., rule R5). In this case, a sync byte ($F0_H$) is provided at 304, followed by one or more Z-bytes at 306. A start byte S ($50_H$) is then provided at 308 to indicate the starting position for the first data bytes in the frame data field, followed by the data bytes $D_0$-$D_{j-1}$ at 310, and the method 200 returns to create the next frame at 204 in FIG. 2A.

In the case where the next packet will complete in the current frame (YES at 300 in FIG. 2F), the method 200 proceeds to FIG. 2G, where the frame is constructed at 320-336 (rule R8 in the exemplary protocol 100 of FIG. 1). A sync byte ($F0_H$) is provided at 320 to delineate the start of the current frame, zero, one, or more Z-bytes ($00_H$) are provided at 322 after the sync byte, and a control byte $C_i$ is provided at 326 to indicate the end of the packet data bytes in the frame. At 328, zero, one or more Z-bytes ($00_H$) are provided after the control byte $C_i$, and a start byte S ($50_H$) is provided at 330. Thereafter, the corresponding packet data bytes $D_1$-$D_{q-1}$ are provided at 332 for the current packet. A determination is then made at 334 as to whether another (short) packet is to be provided in the frame. If so (YES at 334), the method proceeds to 322-332 as described above, where one or more optional Z-bytes ($00_H$) may be provided at 322 prior to providing the next control byte $C_i$ at 326. Otherwise (NO at 334), the remaining byte fields are filled with Z-bytes ($00_H$) at 336, and the method 200 returns to 204 in FIG. 2A for creating the next frame.

Figure 2H:
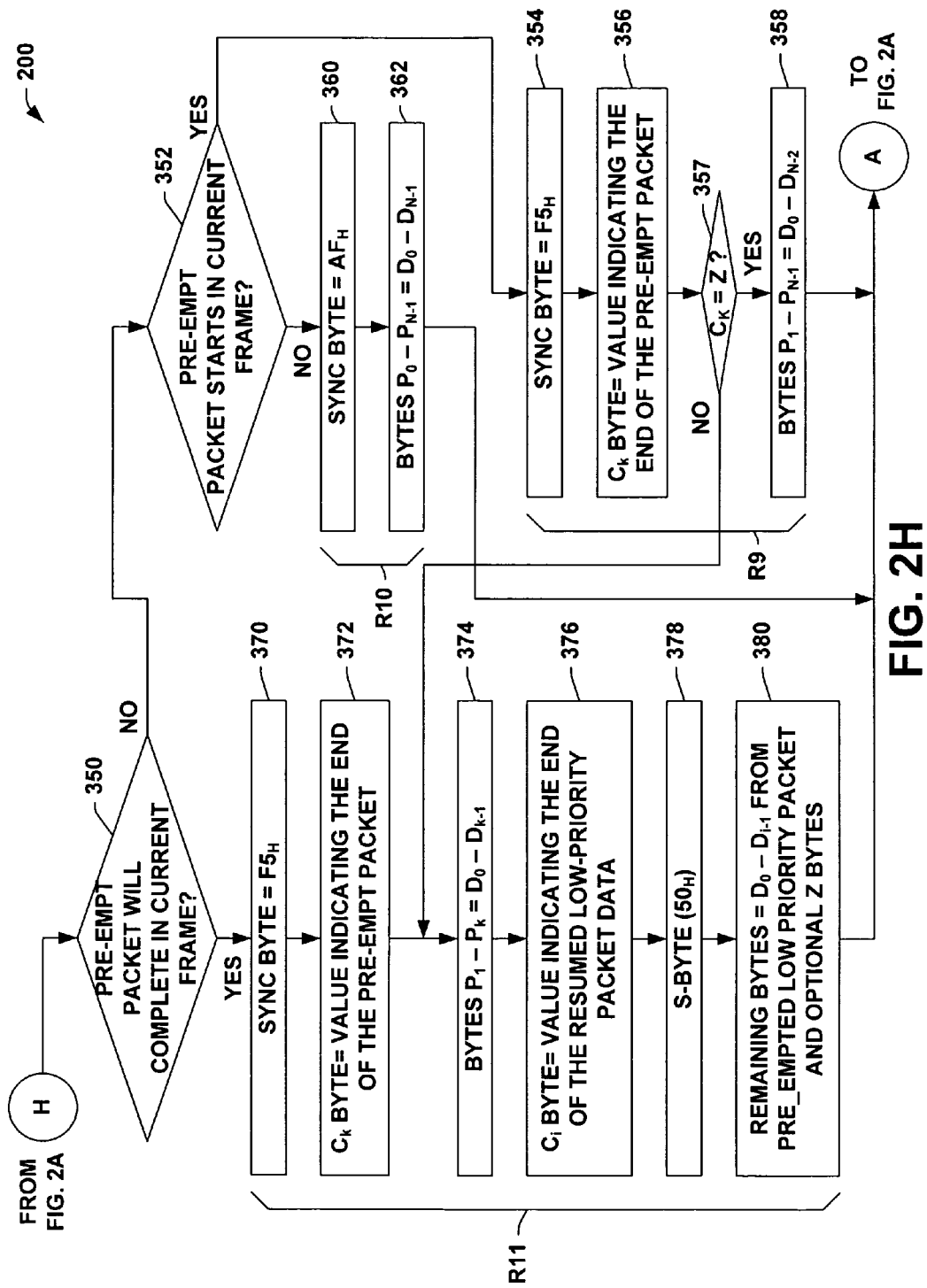

Referring now to FIGS. 2A and 2H, where a pre-emption occurs (e.g., YES at 205 in FIG. 2A, where a high-priority packet is ready for transport in the communication system and a lower priority packet transmission has already begun but is not yet completed), the method 200 proceeds to FIG. 2H. At 350 in FIG. 2H, a determination is made as to whether the pre-empting packet will complete in the current frame (e.g., whether the preempting packet is a short packet). If not (NO at 350, indicating that the pre-empting packet is longer than 62 bytes), a determination is made at 352 as to whether the preempting packet begins in the current frame.

If so (YES at 352), the method 200 proceeds to 354 through 358 or to 354 through 380, to construct the current frame according to rule R9 of FIG. 1B above. In one such case (a long pre-empting packet is starting but not completing), a sync byte $F5_H$ is provided at 354 at the frame boundary to indicate that a pre-empting packet is being provided. Following the special sync byte, a control byte $C_k$ is provided at 356 (e.g., in position $P_0$ in FIG. 1B) indicating the end of the pre-empting packet, which is a Z-byte for the present case in which the pre-empting packet continues to later frames (e.g., long pre-empting packet). At 357, a determination is made as to whether the control byte $C_K$ has a value of Z. If so (YES at 357), the pre-empting packet will not complete in the current frame, and the remaining byte fields at positions $P_1$ through $P_{63}$ are then provided with the pre-empting packet data bytes $D_0$ through $D_{N-2}$ at 358, and the method returns to 204 in FIG. 2A. Otherwise, (NO at 357, wherein the control byte $C_K$ is not equal to Z), the method proceeds to 374 through 380 as described further below.

If the pre-empting packet will not complete in the current frame (NO at 350 in FIG. 2H) and does not start in the current frame (NO at 352), rule R10 of FIG. 1B is employed at 360 and 362. In this case, a sync byte is provided at 360 having a value of $AF_H$, and the remaining byte fields $P_0$ through $P_{63}$ are then provided with the pre-empting packet data bytes $D_0$ through $D_{63}$ at 362, after which the method 200 returns to 204 in FIG. 2A.

In the case where the pre-empting packet will complete in the current frame (YES at 350 in FIG. 2H), the rule R11 is used at 370-380 to construct the frame. At 370, a sync byte is provided having a value $F5_H$ indicating that the frame contains the end of a pre-empting packet, and a control byte $C_k$ is provided at 372 at position $P_0$ in FIG. 1B, which indicates the end of the pre-empting packet in the current frame. The final data bytes $D_0$ through $D_{k-1}$ are then provided in the frame byte field positions $P_1$ through $P_k$ at 374.

The present invention advantageously provide for resuming at least a portion of a suspended low-priority packet in the same frame that a pre-empting packet completes, if space allows, in accordance with the exemplary rule R11 at 376 through 380. A control byte $C_i$ is provided at 376 in the data field after the final data byte of the pre-empting higher priority data packet (e.g., at position $P_{k+1}$ in the example of FIG. 1B), which is indicative of an end of the data bytes of the suspended low-priority data packet in the data field. The control byte $C_i$ in the exemplary implementation is in the next byte field following the last pre-empting data packet byte, but alternative implementations are possible within the scope of the invention, wherein one or more Z-bytes may optionally be provided between the last pre-empting packet data byte and the control byte $C_i$ at 376.

A start byte S ($50_H$) is then provided at 378 after the control byte $C_i$ and before the data bytes of the suspended low-priority data packet, where the start byte S is indicative of a start of the remaining data bytes of the suspended low-priority data packet in the data field. In the illustrated example of FIG. 1B, the start byte S is in the next byte field following the control byte $C_i$. However, one or more Z-bytes may optionally be provided between the control byte $C_i$ and the start byte S at 378 within the scope of the invention. One or more remaining data bytes from the suspended low-priority packet are then provided in the remaining byte fields of the frame at 380, before the method 200 returns to 204 in FIG. 2A, wherein one or more Z-bytes may optionally be provided between the start byte S and the data bytes of the suspended packet. In some implementations S-byte may not be used at all, while one of Z-bytes in combination with $C_i$ could be used instead as indications of the start of the packet.

While the remaining low-priority data from the suspended packet fills the rest of the data field in the example of FIG. 1B, this is not a strict requirement of the invention, wherein the remainder data need not extend to the final frame position $P_{63}$, in which case the final positions may be filled with Z-bytes. Moreover, as discussed above, if the end of the remainder data is beyond the current 64-byte frame (e.g., the remaining low-priority suspended data will not fit in the current frame), the control byte $C_i$ is set to Idle (Z-byte), similar to the case of rule R9 in FIG. 1B. Also, it is possible that the remainder data from the suspended low-priority packet may complete in the current frame, and there may be enough space left to begin another packet, in which case yet another control byte, start byte, and data bytes may be inserted according to the above short packet rules (e.g., R8). It should be noted that the described rules could be used for so-called multi-level pre-emption, when several priority levels are set. In the case of multi-level pre-emption, a packet of any priority level can be pre-empted by a packet of any higher priority, and resumed as all the previously started higher priority packets are completed.

Although the invention has been illustrated and described with respect to one or more implementations, alterations and/ or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method of encapsulating data from prioritized data packets in frames for transport in a DSL communication system, the method comprising:
    forming frames consisting of an integer number M sync bytes indicative of a frame boundary and a data field consisting of an integer number N byte fields, M and N being positive integers, wherein the individual frames are a fixed number N+M bytes long and further configured for transmission as individual frames in the DSL communication system;
    encapsulating data from data packets in data fields of one or more frames for transportation in the DSL communication system, wherein a length of at least one of the data packets to be encapsulated is larger than the length of a data field of each frame;
    selectively suspending encapsulation of data from a data packet of a first priority to encapsulate data from a pre-empting data packet of a second priority; and
    resuming encapsulation of at least a portion of remaining data from a suspended data packet of the first priority in a frame in which a pre-empting data packet of the second priority is completed;
    wherein both the pre-empting and pre-empted data packets can be short packets having a length less than N-1 bytes;
    wherein the pre-empting packet is a short packet that starts and completes in a single frame, and wherein resuming encapsulation of at least a portion of the remaining data comprises encapsulating at least a portion of the remaining data from the suspended data packet in the frame in which the pre-empting data packet starts and completes;
    wherein resuming encapsulation of at least a portion of remaining data from a suspended data packet comprises providing a control byte in the data field after a final data byte of the pre-empting data packet, the control byte being indicative of an end of the data bytes of the suspended data packet in the data field of the same frame.

2. The method of claim 1, wherein resuming encapsulation of at least a portion of remaining data from a suspended data packet further comprises providing a start byte in the data field after the control byte and before the data bytes of the suspended data packet, the start byte being indicative of a start of the remaining data bytes of the suspended data packet in the data field.

3. The method of claim 1, wherein M=1 and N=64.

4. The method of claim 1, wherein resuming encapsulation of at least a portion of remaining data from a suspended data packet further comprises providing the M sync bytes that indicate that the pre-empting data packet completes in the current frame.

5. The method of claim 1, wherein the data packets to be encapsulated are Ethernet packets.

6. A pre-emption method for prioritized encapsulation of data packets in fixed length N+M byte frames for transport in a DSL communication system, the pre-emption method comprising:
    selectively suspending encapsulation of data from a low-priority data packet to encapsulate data from a higher priority pre-empting data packet;
    resuming encapsulation of at least a portion of remaining data from a suspended low-priority data packet in a frame in which a pre-empting higher priority data packet is completed,
    wherein the resulting frame is a fixed number N+M bytes long, wherein M is an integer number of sync bytes indicative of a frame boundary and N is an integer number of data bytes in a data field of the frame, and wherein a length of at least one of the data packets to be encapsulated is larger than the length of a data field of each frame; and
    transmitting the resulting frame as an individual frame over a transmission medium of the DSL communication system;
    wherein resuming encapsulation of at least a portion of remaining data from a suspended low-priority data packet comprises providing a control byte in the data field after a final data byte of the pre-empting higher priority data packet, the control byte being indicative of an end of the data bytes of the suspended low-priority data packet in the data field.

7. The pre-emption method of claim 6, wherein the data packets can be short packets having a length less than N-1 bytes.

8. The pre-emption method of claim 7, wherein the higher priority pre-empting packet is a short packet that starts and completes in a single frame, and wherein resuming encapsulation of at least a portion of the remaining data comprises encapsulating at least a portion of the remaining data from the suspended low-priority data packet in the frame in which the higher priority pre-empting data packet starts and completes.

9. The pre-emption method of claim 6, wherein resuming encapsulation of at least a portion of remaining data from a suspended low-priority data packet further comprises providing a start byte in the data field after the control byte and before the data bytes of the suspended low-priority data packet, the start byte being indicative of a start of the remaining data bytes of the suspended low-priority data packet in the data field.

10. The pre-emption method of claim 6, wherein resuming encapsulation of at least a portion of remaining data from a suspended low-priority data packet further comprises providing the M sync bytes that indicate that the higher priority pre-empting data packet completes in the current frame.

11. The pre-emption method of claim 6, wherein the data packets to be encapsulated are Ethernet packets.

12. The pre-emption method of claim 6, wherein the frames consist of an integer number M sync bytes and an integer number N data bytes.

13. A DSL communication device, comprising:
    a network layer component configured to provide data packets of differing priorities;

a data link layer component configured to encapsulate data from the data packets in frames for subsequent transport, the frames having M sync bytes indicative of a frame boundary, and a data field having N byte fields, wherein M and N are both positive integers, and wherein the individual frames are a fixed number N+M bytes long, wherein a length of at least one of the data packets to be encapsulated is larger than the length of the data field of each frame, and wherein the frames are configured to be transmitted as individual frames; and a physical link layer component configured to transfer the frames as individual frames as an electrical signal over a transmission medium, wherein the data link layer component is further configured to selectively suspend encapsulation of data from a data packet of a first priority to encapsulate data from a pre-empting data packet of a second priority, and resume encapsulation of at least a portion of remaining data from a suspended data packet of the first priority in a frame in which a pre-empting data packet of the second priority is completed;

wherein the data link layer component is configured to resume encapsulation of at least a portion of remaining data from a suspended data packet by providing a control byte in the data field after a final data byte of the pre-empting data packet, wherein the control byte is indicative of an end of the data bytes of the suspended data packet in the data field of the same frame.

14. The device of claim 13, wherein the data link layer component is configured to resume encapsulation of at least a portion of remaining data from a suspended data packet by providing a start byte in the data field after the control byte and before the data bytes of the suspended data packet, wherein the start byte is indicative of a start of the remaining data bytes of the suspended data packet in the data field.

15. The device of claim 13, wherein the data link layer component is configured to resume encapsulation of at least a portion of remaining data from a suspended data packet by providing the M sync bytes that indicate that the pre-empting data packet is completed in the current frame.

16. The communication device of claim 13, wherein data packets to be encapsulated are Ethernet packets.

17. The communication device of claim 13, wherein the frames consist of the M sync bytes and the N data bytes.

18. A DSL system comprising:
a first network layer interface configured to transmit or receive a plurality of data packets in fixed length N+M byte frames, the frames having M sync bytes indicative of a frame boundary and a data field of N byte fields, wherein M and N are both positive integers; and
an encapsulation component for prioritized encapsulation of the data packets, the encapsulated data packets being encapsulated for transport as individual frames in a DSL communication system, wherein the encapsulation component is configured to selectively suspend encapsulation of data from a low-priority data packet to encapsulate data from a higher priority pre-empting data packet, and resume encapsulation of at least a portion of remaining data from a suspended low-priority data packet in a frame in which a pre-empting higher priority data packet is completed, and wherein a length of at least one of the data packets to be encapsulated is larger than the length of the data field of each frame;

wherein the encapsulation component is configured to resume encapsulation of at least a portion of remaining data from a suspended low-priority data packet by providing a control byte in the data field after a final data byte of the pre-empting higher priority data packet, wherein the control byte is indicative of an end of the data bytes of the suspended low-priority data packet in the data field.

19. The system of claim 18, wherein the data packets comprise short packets having a length less than N-1 bytes.

20. The system of claim 19, wherein the higher priority pre-empting packet is a short packet that starts and completes in a single frame, and wherein the encapsulation component is configured to resume encapsulation of at least a portion of the remaining data by encapsulating at least a portion of the remaining data from the suspended low-priority data packet in the frame in which the higher priority pre-empting data packet starts and completes.

21. The system of claim 18, wherein the encapsulation component is configured to resume encapsulation of at least a portion of remaining data from a suspended low-priority data packet by providing a start byte in the data field after the control byte and before the data bytes of the suspended low-priority data packet, wherein the start byte is indicative of a start of the remaining data bytes of the suspended low-priority data packet in the data field.

22. The system of claim 18, wherein the encapsulation component is configured to resume encapsulation of at least a portion of remaining data from a suspended low-priority data packet by providing the M sync bytes that indicate that the higher priority pre-empting data packet is completed in the current frame.

23. The system of claim 18, wherein the data packets to be encapsulated are Ethernet packets.

24. The system of claim 18, wherein the frames consist of the M sync bytes and the N data bytes.

25. A method of encapsulating data from prioritized data packets in frames for transport in a DSL communication system, the method comprising:
forming frames consisting of an integer number M sync bytes indicative of a frame boundary and a data field consisting of an integer number N byte fields, M and N being positive integers, wherein the individual frames are a fixed number N+M bytes long and further configured for transmission as individual frames in the DSL communication system;
encapsulating data from data packets in data fields of one or more frames for transportation in the DSL communication system, wherein a length of at least one of the data packets to be encapsulated is larger than the length of a data field of each frame;
selectively suspending encapsulation of data from a data packet of a first priority to encapsulate data from a pre-empting data packet of a second priority; and
resuming encapsulation of at least a portion of remaining data from a suspended data packet of the first priority in a frame in which a pre-empting data packet of the second priority is completed;
wherein both the pre-empting and pre-empted data packets can be short packets having a length less than N-1 bytes;
wherein resuming encapsulation of at least a portion of remaining data from a suspended data packet comprises providing a control byte in the data field after a final data byte of the pre-empting data packet, the control byte being indicative of an end of the data bytes of the suspended data packet in the data field.

26. The method of claim 25, wherein resuming encapsulation of at least a portion of remaining data from a suspended data packet further comprises providing a start byte in the data field after the control byte and before the data bytes of the suspended data packet, the start byte being indicative of a start of the remaining data bytes of the suspended data packet in the data field.

27. A method of encapsulating data from prioritized data packets in frames for transport in a DSL communication system, the method comprising:
    forming frames consisting of an integer number M sync bytes indicative of a frame boundary and a data field consisting of an integer number N byte fields, M and N being positive integers, wherein the individual frames are a fixed number N+M bytes long and further configured for transmission as individual frames in the DSL communication system;
    encapsulating data from data packets in data fields of one or more frames for transportation in the DSL communication system, wherein a length of at least one of the data packets to be encapsulated is larger than the length of a data field of each frame;
    selectively suspending encapsulation of data from a data packet of a first priority to encapsulate data from a pre-empting data packet of a second priority; and
    resuming encapsulation of at least a portion of remaining data from a suspended data packet of the first priority in a frame in which a pre-empting data packet of the second priority is completed;
    wherein resuming encapsulation of at least a portion of remaining data from a suspended data packet comprises providing a control byte in the data field after a final data byte of the pre-empting data packet, the control byte being indicative of an end of the data bytes of the suspended data packet in the data field of the same frame.

28. The method of claim 27, wherein resuming encapsulation of at least a portion of remaining data from a suspended data packet further comprises providing a start byte in the data field after the control byte and before the data bytes of the suspended data packet, the start byte being indicative of a start of the remaining data bytes of the suspended data packet in the data field.

29. A DSL communication device, comprising:
    a network layer component configured to provide data packets of differing priorities;
    a data link layer component configured to encapsulate data from the data packets in frames for subsequent transport, the frames having M sync bytes indicative of a frame boundary, and a data field having N byte fields, wherein M and N are both positive integers, and wherein the individual frames are a fixed number N+M bytes long, wherein a length of at least one of the data packets to be encapsulated is larger than the length of the data field of each frame, and wherein the frames are configured to be transmitted as individual frames; and
    a physical link layer component configured to transfer the frames as individual frames as an electrical signal over a transmission medium,
    wherein the data link layer component is further configured to selectively suspend encapsulation of data from a data packet of a first priority to encapsulate data from a pre-empting data packet of a second priority, and resume encapsulation of at least a portion of remaining data from a suspended data packet of the first priority in a frame in which a pre-empting data packet of the second priority is completed;
    wherein both the pre-empting and pre-empted data packets comprise short packets having a length less than N-1 bytes;
    wherein the pre-empting packet is a short packet that starts and completes in a single frame, and wherein the data link layer component is configured to encapsulate at least a portion of the remaining data from the suspended data packet in the frame in which the pre-empting data packet starts and completes;
    wherein data link layer component is configured to resume encapsulation of at least a portion of remaining data from a suspended data packet by providing a control byte in the data field after a final data byte of the pre-empting data packet, wherein the control byte is indicative of an end of the data bytes of the suspended data packet in the data field of the same frame.

30. The device of claim 29, wherein the data link layer component is configured to resume encapsulation of at least a portion of remaining data from a suspended data packet by providing a start byte in the data field after the control byte and before the data bytes of the suspended data packet, wherein the start byte is indicative of a start of the remaining data bytes of the suspended data packet in the data field.

31. A DSL communication device, comprising:
    a network layer component configured to provide data packets of differing priorities;
    a data link layer component configured to encapsulate data from the data packets in frames for subsequent transport, the frames having M sync bytes indicative of a frame boundary, and a data field having N byte fields, wherein M and N are both positive integers, and wherein the individual frames are a fixed number N+M bytes long, wherein a length of at least one of the data packets to be encapsulated is larger than the length of the data field of each frame, and wherein the frames are configured to be transmitted as individual frames; and
    a physical link layer component configured to transfer the frames as individual frames as an electrical signal over a transmission medium,
    wherein the data link layer component is further configured to selectively suspend encapsulation of data from a data packet of a first priority to encapsulate data from a pre-empting data packet of a second priority, and resume encapsulation of at least a portion of remaining data from a suspended data packet of the first priority in a frame in which a pre-empting data packet of the second priority is completed;
    wherein the data link layer component is configured to resume encapsulation of at least a portion of remaining data from a suspended data packet by providing a control byte in the data field after a final data byte of the pre-empting data packet, wherein the control byte is indicative of an end of the data bytes of the suspended data packet in the data field of the same frame;
    wherein both the pre-empting and pre-empted data packets comprise short packets having a length less than N-1 bytes;
    wherein the data link layer component is configured to resume encapsulation of at least a portion of remaining data from a suspended data packet by providing a control byte in the data field after a final data byte of the pre-empting data packet, wherein the control byte is indicative of an end of the data bytes of the suspended data packet in the data field.

32. The device of claim 31, wherein the data link layer component is configured to resume encapsulation of at least a portion of remaining data from a suspended data packet by providing a start byte in the data field after the control byte and before the data bytes of the suspended data packet, wherein the start byte is indicative of a start of the remaining data bytes of the suspended data packet in the data field.

* * * * *